(12) United States Patent
Nozaki

(10) Patent No.: US 9,054,626 B2
(45) Date of Patent: Jun. 9, 2015

(54) MOTOR CONTROL APPARATUS

(75) Inventor: Takeshi Nozaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 253 days.

(21) Appl. No.: 13/643,349

(22) PCT Filed: Apr. 26, 2010

(86) PCT No.: PCT/JP2010/057379
§ 371 (c)(1),
(2), (4) Date: Oct. 25, 2012

(87) PCT Pub. No.: WO2011/135652
PCT Pub. Date: Nov. 3, 2011

(65) Prior Publication Data
US 2013/0038342 A1     Feb. 14, 2013

(51) Int. Cl.
*H02P 27/08*  (2006.01)
*H02P 29/02*  (2006.01)
*B60L 3/00*   (2006.01)

(52) U.S. Cl.
CPC ............. *H02P 29/021* (2013.01); *B60L 3/0038* (2013.01); *Y02T 10/642* (2013.01)

(58) Field of Classification Search
CPC ....................................................... H02P 27/08
USPC ................ 324/765.01, 750.01, 546; 318/162, 318/400.07
See application file for complete search history.

(56) References Cited

U.S. PATENT DOCUMENTS

2008/0018278 A1*  1/2008  Ta et al. ................... 318/400.17

FOREIGN PATENT DOCUMENTS

| JP | 9-172791    | 6/1997 |
|----|-------------|--------|
| JP | 2000-116176 | 4/2000 |
| JP | 2001-8483   | 1/2001 |
| JP | 2004-56889  | 2/2004 |
| JP | 2005-51839  | 2/2005 |
| JP | 2008-22645  | 1/2008 |
| JP | 2008-92708  | 4/2008 |

* cited by examiner

*Primary Examiner* — Vincent Q Nguyen
(74) *Attorney, Agent, or Firm* — Finnegan, Henderson, Farabow, Garrett & Dunner, LLP

(57) ABSTRACT

Provided is a motor control apparatus that can easily distinguish between a current sensor abnormality and a rotation-angle sensor abnormality, without making a current sensor a duplex system. An MGECU estimates a W-phase current on the basis of a V-phase current detected by a current sensor, and estimates the V-phase current on the basis of a detected W-phase current. An actual torque of a motor generator is estimated on the basis of the detected V-phase current and the estimated W-phase current, and the actual torque of the motor generator is also estimated on the basis of the detected W-phase current and the estimated V-phase current. Then, an evaluation is made whether an abnormality is an abnormality of the current sensor or an abnormality of a resolver, on the basis of the differences between the torque command value for the motor generator and both the estimated actual torques.

9 Claims, 5 Drawing Sheets

MOTOR CONTROL APPARATUS

TECHNICAL FIELD

The present invention relates to a motor control apparatus, and more particularly to a motor control apparatus including a current sensor and a rotation-angle sensor (resolver).

BACKGROUND ART

In motor control apparatus mounted in hybrid vehicles and electric vehicles, direct current voltage supplied from a direct current power source is converted by an inverter to alternating current voltage to drive a motor generator (MG). The electric current flowing in each phase of the motor generator MG is detected by a current sensor, and a voltage command value to be applied to a coil of each phase of the motor generator MG is calculated. The inverter, on the basis of the voltage command for the coil of each phase, turns a switching transistor on and off to drive the motor generator MG with a torque command value which is instructed. In such a motor control apparatus, it is necessary to reliably detect and cope with various abnormality modes associated with the motor control.

Patent Document 1 discloses a motor drive controller including an abnormality detection unit for detecting an abnormality of a motor based on a torque command value requested for the motor and an estimated actual torque which is actually generated in the motor. Patent Document 1 further discloses that driving current of each phase to be supplied to the motor is detected and q-axis current which is a torque current component of the motor is calculated based on the detected driving current, and the actual torque is estimated from the calculated q-axis current, the magnetic flux of the motor, and the angular speed of the motor.

Patent Document 2 discloses detecting current of a first phase (e.g. U-phase) and current of a second phase (e.g. V-phase) of three-phase alternating current flowing in a three-phase alternating current motor, obtaining an integrated value of a first-phase current value detected for a predetermined time period and an integrated value of a second-phase current value detected for a predetermined time period and comparing these values, and determining an abnormality of a current sensor when a difference between these values exceeds a predetermined value.

PRIOR ART DOCUMENTS

Patent Documents

Patent Document 1: JP 2008-92708 A
Patent Document 2: JP 2004-56889 A

DISCLOSURE OF THE INVENTION

Technical Problems

Here, in order to detect an abnormality of a current sensor, there is proposed a method in which a current sensor is configured as a redundant system or a duplex system and an abnormality is detected when a deviation between the sensors forming the duplex system is of a predetermined level or greater. While this method enables reliable detection of an abnormality of the current sensors, the number of components is increased so as to form the duplex system, leading to an increase in cost. It is therefore desired to detect an abnormality of the current sensor without configuring the current sensor as a duplex system, in order to achieve a cost reduction.

With the structure in which an actual torque is estimated based on the current and angular speed of each phase of the motor and an abnormality is detected based on a comparison between a torque command and the estimated actual torque, while it is possible to detect an abnormality of the motor, it is not possible to specify the abnormality mode or the location of the abnormality. More specifically, while the torque command value and the actual torque are different when an abnormality occurs in the current sensor, the torque command value and the actual torque are also different when an abnormality occurs in the angular-speed sensor.

The present invention provides an apparatus which can easily distinguish between an abnormality of a current sensor and other abnormalities (e.g. an abnormality of a rotation-angle sensor), without forming the current sensor as a duplex system.

Solution to Problems

The present invention is characterized by including an inverter that supplies electric power to a multi-phase motor, a current sensor that is provided on an output side of the inverter for detecting current of a first phase and current of a second phase of the multi-phase motor, an estimation unit that estimates, from at least one of the current of the first phase and the current of the second phase, current of the other phase, and a determination unit that determines an abnormality of the current sensor based on a difference between the current that is detected and the current that is estimated.

According to one embodiment of the present invention, the estimation unit includes a unit that estimates current of the second phase based on the current of the first phase that is detected by the current sensor, a unit that estimates current of the first phase based on the current of the second phase that is detected by the current sensor, a unit that estimates a first actual torque of the multi-phase motor based on the current of the first phase that is detected by the current sensor and the current of the second phase that is estimated, and a unit that estimates a second actual torque of the multi-phase motor based on the current of the second phase that is detected by the current sensor and the current of the first phase that is estimated, and the determination unit determines an abnormality of the current sensor based on a difference between a torque command value for driving the multi-phase motor with a desired torque and the first actual torque and a difference between the torque command value and the second actual torque.

According to one embodiment of the present invention, the determination unit determines that the abnormality occurs in the current sensor when there exists a difference between the torque command value for driving the multi-phase motor with a desired torque and the first actual torque or a difference between the torque command value and the second actual torque, and determines that the abnormality does not occur in the current sensor when there exists neither a difference between the torque command value and the first actual torque nor a difference between the torque command value and the second actual torque.

According to still another embodiment of the present invention, the determination unit determines that the abnormality occurs in the current sensor that detects the current of the first phase when the difference between the torque command value and the first actual torque is greater than the difference between the torque command value and the second actual torque, and determines that the abnormality occurs in the current sensor that detects the current of the second phase when the difference between the torque command value and the second actual torque is greater than the difference between the torque command value and the first actual torque.

According to a further embodiment of the present invention, a rotation angle sensor that detects a rotation angle of the motor is further provided, and the estimation unit includes a unit that estimates current of the second phase based on the current of the first phase that is detected by the current sensor, a unit that estimates current of the first phase based on the current of the second phase that is detected by the current sensor, a unit that estimates a first actual torque of the multi-phase motor based on the current of the first phase that is detected by the current sensor, the current of the second phase that is estimated, and the rotation angle, a unit that estimates a second actual torque of the multi-phase motor based on the current of the second phase that is detected by the current sensor, the current or the first phase that is estimated, and the rotation angle, and a unit that estimates a third actual torque of the multi-phase motor based on the current of the first phase that is detected by the current sensor, the current of the second phase that is detected by the current sensor, and the rotation angle, and the determination unit determines whether an abnormality occurs in the current sensor or in the rotation angle sensor based on a difference between a torque command value for driving the multi-phase motor with a desired torque and the first actual torque, a difference between the torque command value and the second actual torque, and a difference between the torque command value and the third actual torque.

According to still a further embodiment of the present invention, the determination unit determines that the abnormality occurs in the current sensor when there exists a difference between the torque command value for driving the multi-phase motor with a desired torque and the first actual torque or a difference between the torque command value and the second actual torque, and determines that the abnormality occurs in the rotation angle sensor when there exists neither a difference between the torque command value and the first actual torque nor a difference between the torque command value and the second actual torque and there exists a difference between the torque command value and the third actual torque.

According to another embodiment of the present invention, a unit that drives the multi-phase motor with a zero torque is further provided, and, when there exists neither a difference between the torque command value and the first actual torque nor a difference between the torque command value and the second actual torque and there exists a difference between the torque command value and the third actual torque, the determination unit determines that an abnormality occurs in the rotation sensor if the third actual torque is not zero after the multi-phase motor is driven by the drive unit and determines that an abnormality occurs in an element other than the current sensor and the rotation sensor if the third actual torque is zero after the multi-phase motor is driven by the drive unit Advantageous Effects of Invention According to the present invention, it is possible to easily distinguish an abnormality of the current sensor and other abnormalities without forming the current sensor in a duplex system.

MODE FOR CARRYING OUT THE INVENTION

Preferred embodiments of the present invention will be described with reference to the drawings.

1. Basic Structure of Motor Control Apparatus

Figure 1:
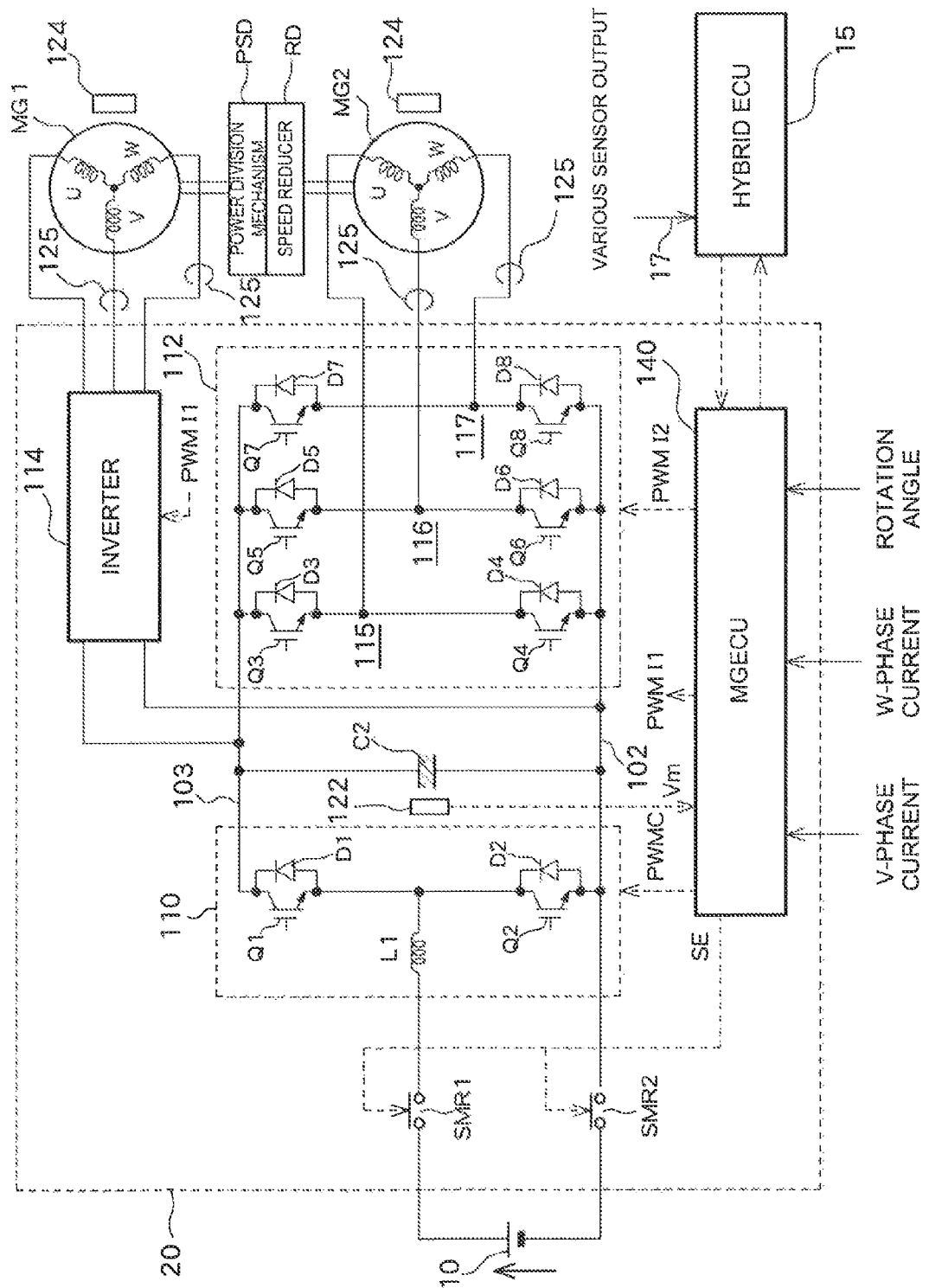
FIG. 1
Block diagram illustrating a structure according to an embodiment.

First, the basic structure of a motor control apparatus will be described. A motor control apparatus is mounted in a hybrid vehicle. As illustrated in FIG. 1, the motor control apparatus includes a battery 10 which serves as a power source, a hybrid ECU (electric control unit) 15, and a PCU (power control unit) 20.

The battery 10, which is formed of a nickel metal hydride battery, a lithium-ion battery, or the like, supplies direct current voltage to the PCU 20 and is charged with direct current voltage supplied from the PCU 20.

The hybrid ECU 15 performs overall control of a hybrid vehicle based on various sensor outputs representing an operation status and a vehicle status, that are sensor outputs such as the accelerator opening and the wheel speed, for example.

The PCU 20, during a power running operation of motor generators MG1 and MG2, boosts the direct current voltage from the battery 10 in accordance with a control command supplied from the hybrid ECU 15 and also converts the direct current voltage which is boosted to alternating current voltage to drive-control the motor generators MG1 and MG2. Further, the PCU 20, during regenerative braking of the motor generators MG1 and MG2, converts the alternating current voltage generated by the motor generators MG1 and MG2 to direct current voltage in accordance with a control command supplied from the hybrid ECU 15 to charge the battery 10. The PCU 20 includes system main relays SMR1 and SMR2, a converter 110, a smoothing capacitor C2, inverters 112 and 114, a resolver 124, and an MGECU 140.

The system main relays SMR1 and SMR2 switch power supply paths from the battery 10 to the inverters 112 and 114 on and off. The system main relay SMR1 is connected between a positive electrode of the battery 10 and a power source line 103, and the system main relay SMR2 is connected between a negative electrode of the battery 10 and an earth line 102. The system main relays SMR1 and SMR2 are controlled on and off based on a control signal SE from the MGECU 140.

The converter 110 is formed of a buck-boost chopper circuit and includes a reactor L1, semiconductor switching elements for electric power Q1 and Q2, and diodes D1 and D2. The switching elements Q1 and Q2 are connected in series between the power source line 103 and the earth line 102. The reactor L1 is connected between the system main relay SMR1 and a connection node between the switching elements Q1 and Q2. The diode D1 is connected between the emitter and collector of the switching elements Q1, and the diode D2 is connected between the emitter and collector of the switching element Q2, to thereby serve as inverse-parallel diodes, and so as to allow electric current to flow from the emitter side to the collector side. A gate control signal is supplied to the gate of each of the switching elements Q1 and Q2, and the switching elements Q1 and Q2 are controlled on and off in response to this gate control signal. Each of the switching elements Q1 and Q2 is formed of an IGBT (Insulated Gate Bipolar Transistor), for example. The converter 110 receives voltage Vb from the battery 10 as an input, between the power source line 103 and the earth line 102, and boosts the input voltage Vb under the switching control of the switching elements Q1 and Q2 to output voltage for motor driving (motor operating voltage). The boost ratio of the converter 110 is determined in accordance with the ON-period ratio of the switching elements Q1 and Q2; i.e., the duty ratio. Further, the converter 110 steps down the regenerated voltage during regenerative braking and returns the voltage to the battery 10. In other words, the converter 110 is a bidirectional converter.

The MGECU 140 generates a voltage command value Vm* of the motor operating voltage based on torque command values Tm1* and Tm2* of the motor generators MG1 and MG2, respectively, supplied from the hybrid ECU 15, and determines the boost ratio of the converter 110 based on the voltage command value Vm* which is generated. Then, the MGECU 140 outputs a gate control signal to the switching elements Q1 and Q2 so as to realize this boost ratio.

A smoothing capacitor C2, which is connected between the power source line 103 and the earth line 102, smoothes the motor operating voltage output from the converter 110 and supplies the smoothed motor operating voltage to the inverters 112 and 114. A voltage sensor 122 detects voltage at both terminals of the smoothing capacitor C2; i.e., the motor operating voltage, and outputs the detected motor operating voltage to the MGECU 140.

The inverter 122 converts the motor operating voltage into three-phase alternating current and outputs it to the motor generator MG2, which drives the wheels. Further, the inverter 122 returns to the convertor 110 the electric power generated by the motor generator MG2 in association with the regenerative braking. The inverter 112 includes switching elements Q3 to Q8 forming a U-phase arm 115, a V-phase arm 116, and a W-phase arm 117, that are connected in parallel between the power source line 103 and the earth line 102. Each of inverse parallel diodes D3 to D8 is connected between the collector and emitter of the respective switching element Q3 to Q8. An intermediate point of the arm of each phase of the inverter 112 is connected with a corresponding phase end of each phase coil of the motor generator MG2, which is a three-phase permanent magnet motor. The other end of each phase coil is connected to a common neutral point. A current sensor is provided to two phases of the three phases, for detecting electric current. In the present embodiment, a current sensor 125 is provided to each of V-phase and W-phase, for detecting V-phase current and W-phase current. The current sensor for V-phase and the current sensor for W-phase output the V-phase current and the W-phase current that are detected, respectively, to the MGECU 140.

The resolvers 124 detect the rotation angles of the motor generators MG1 and MG2 respectively and output them to the MGECU 140.

The inverter 114 is connected in parallel to the inverter 112 with respect to the converter 110. The inverter 114 converts the motor operating voltage output from the converter 110 into three-phase alternating current and outputs it to the motor generator MG1. The inverter 114 drives the motor generator MG1 at the time of starting the engine, for example. Further, the inverter 114 returns the electric power, which is generated by the motor generator MG1 with a rotation torque transmitted from a crank shaft 50 of the engine, to the converter 110. The structure of the inverter 114 is similar to that of the inverter 112.

The hybrid ECU 15 generates operation commands for the motor generators MG1 and MG2, based on outputs 17 from various sensors, such that desired driving power and electric power can be generated, and outputs the operation commands to the MGECU 140. The operation commands include operation permission/prohibition of the motor generators MG1 and MG2 and torque command values Tm1* and Tm2*.

The MGECU 140, under feedback control based on currents of the V-phase and the W-phase and the rotation angle of a rotor supplied from the current sensor 125 and the resolver 124, respectively, provided in the motor generator MG1, controls the switching operation of the switching elements Q3 to Q8 such that the motor generator MG1 operates in accordance with the operation command from the hybrid ECU 15. Further, the MGECU 140, under feedback control based on currents of the V-phase and the W-phase and the rotation angle of a rotor supplied from the current sensor and the rotation angle sensor (resolver 124) respectively. Which are disposed in the motor generator MG2, controls the switching operation of the switching elements Q3 to Q8 such that the motor generator MG2 operates in accordance with the operation command from the hybrid ECU 15. The MGECU 140, based on the operation command supplied from the hybrid ECU 15, also generates a voltage command value Vm* of the motor operating voltage for high efficiency of the motor generators MG1 and MG2 and determines the boost ratio of the converter 110 based on the voltage command value Vm*. In addition, the MGECU 140 controls the converter 110 so as to step down the alternating current voltage supplied from the inverters 112 and 114 during regenerative braking.

2. Abnormality Detection Processing 2.1 First Abnormality Detection Processing

As described above, the MGECU 140, under feedback control based on the current of the V-phase and the current of the W-phase and the rotation angle of the rotor supplied from the current sensors 125 and the resolver 124 (rotation angle sensor), respectively, that are provided in the motor generator MG1, controls the switching operation of the switching elements Q3 to Q8 such that the motor generator MG1 operates in accordance with the operation command from the hybrid ECU 15, and under feedback control based on the current of the V-phase and the current of the W-phase and the rotation angle of the rotor supplied from the current sensors 125 and the resolver 124, respectively, which are disposed in the motor generator MG2, controls the switching operation of the switching elements Q3 to Q8 such that the motor generator MG2 operates in accordance with the operation command from the hybrid ECU 15. Accordingly, when an abnormality occurs in the current sensor 125 or the resolver 124, it becomes difficult for the MGECU 140 to drive the motor generators MG1 and MG2 with a desired torque. It is therefore necessary to detect such an abnormality immediately and reliably when the abnormality occurs in these sensors.

In order to detect an abnormality of the current sensor 125, it is possible to configure each of the current sensors 125 for V-phase and W-phase in a duplex system and determine whether or not a difference between outputs of the sensors forming the duplex system is within a predetermined range to thereby detect the abnormality. This structure, however, causes a cost increase. It is therefore preferable to detect the abnormality of the current sensor 125 without forming the current sensor 125 in a duplex system.

On the other hand, it is possible to compare the respective torque command values Tm1* and Tm2* supplied from the hybrid ECU 15 with an estimated actual torque value to thereby detect the abnormality without forming the current sensor 125 in a duplex system. In this case, however, it is not possible to distinguish between the abnormality of the current sensor 125 and the abnormality of the resolver 124.

In consideration of the above, the MGECU 140 according to the present embodiment compares each of the torque command values Tm1* and Tm2* with the estimated actual torque value to thereby detect the presence of an abnormality, and further estimates the W-phase current from the V-phase current and estimates the actual torque based on the estimated W-phase current, and compares the estimated actual torque with the torque command value. The MGECU 140 also estimates the V-phase current from the W-phase current and estimates the actual torque based on the estimated V-phase torque, and compares the estimated actual torque with the torque command value. If an abnormality occurs in the current sensor that detects the V-phase current, as an abnormality also occurs in the W-phase current which is estimated based on the V-phase current and therefore the actual torque value which is estimated based on the estimated W-phase current also indicates an abnormal value, a deviation of the estimated actual torque value from the torque command value is increased. On the other hand, if an abnormality occurs in the current sensor that detects the W-phase current, as an abnormality also occurs in the V-phase current which is estimated based on the W-phase current and therefore the actual torque value which is estimated based on the estimated V-phase current also indicates an abnormal value, a deviation of the estimated actual torque value from the torque command value is increased. Accordingly, by comparing the difference between the torque command value and the actual torque value based on the estimated W-phase current value with the difference between the torque command value and the actual torque value based on the estimated V-phase current value, which of the current sensors causes an abnormality can be distinguished. On the other hand, if there is no difference between the two differences, as it indicates that no abnormalities occur in the current sensors, it is possible to determine that it is highly likely that an abnormality occurs in an element other than the current sensors 125, and more specifically in the resolver 124. The MGECU 140, based on such a principle, distinguishes between the abnormality of the current sensor 125 and the abnormality of the resolver 124.

Here, the MGECU 140 distinguishes abnormalities between the current sensor 125 and the resolver 124 provided in each of the motor generators MG1 and MG2 with a similar algorithm.

In the following description, an example in which abnormalities of the current sensor 125 and the resolver 124 disposed in the motor generator MG2 are detected will be described.

Figure 2:
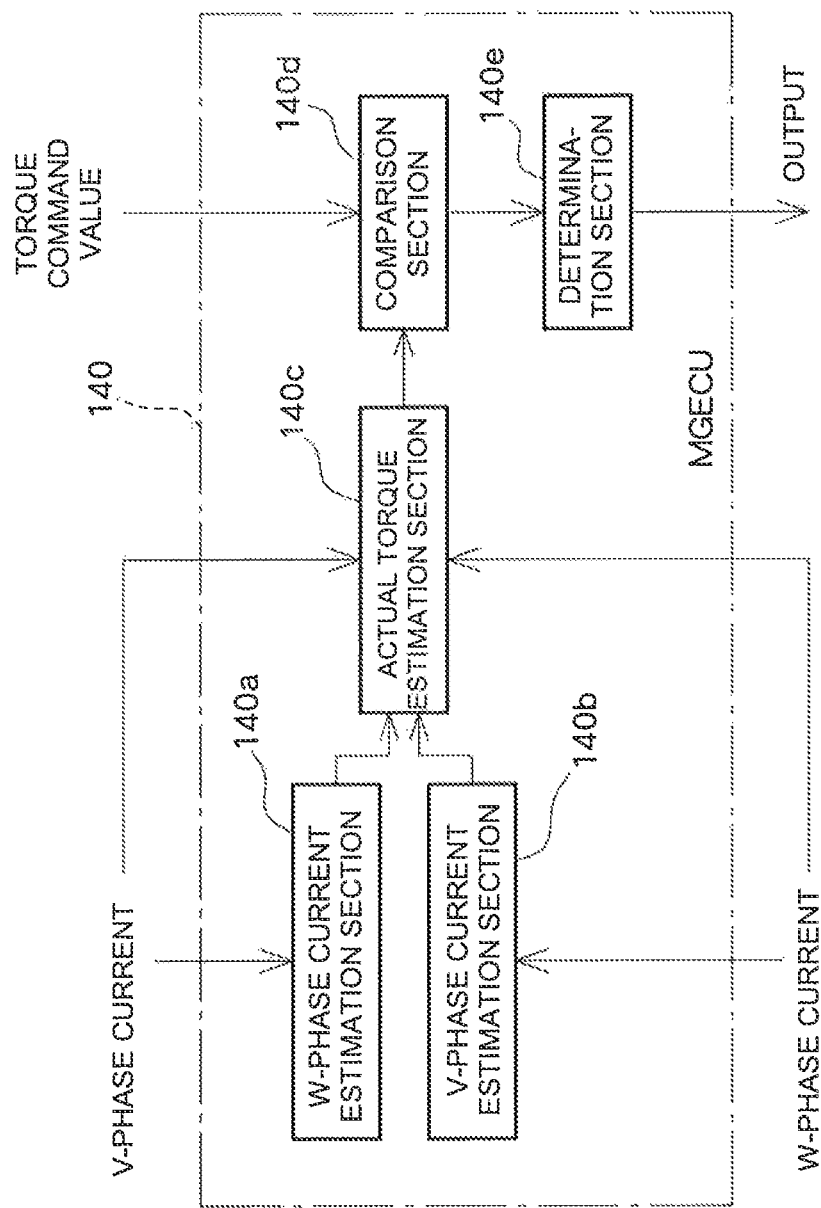
FIG. 2
Block diagram illustrating a function of an MGECU.

FIG. 2 is a block diagram illustrating the function of the MGECU 140. The MGECU 140 includes a W-phase current estimation section 140a, a V-phase current estimation section 140b, an actual torque estimation section 140c, a comparison section 140d, and a determination section 140e.

The W-phase current estimation section 140a estimates current of W-phase of the motor generator MG2 based on the V-phase current output from the V-phase current sensor that detects the current of V-phase of the motor generator MG2. More specifically, while the current of W-phase is detected by the W-phase current sensor that detects the current of W-phase of the motor generator MG2, in addition to this detected current of W-phase, the W-phase current is estimated from the V-phase current (detected V-phase current). As the W-phase is delayed from the V-phase by 120°, the W-phase current can be estimated by delaying the phase of the detected V-phase current by 120° The W-phase current estimation section 140a outputs the W-phase current which is estimated (estimated W-phase current) to the actual torque estimation section 140c.

The V-phase current estimation section 140b estimates current of V-phase of the motor generator MG2 based on the W-phase current output from the W-phase current sensor that detects the current of W-phase of the motor generator MG2. More specifically, while the current of V-phase is detected by the V-phase sensor that detects the current of V-phase of the motor generator MG2, in addition to this detected current of V-phase, the V-phase current is estimated from the W-phase current (detected W-phase current). As the V-phase is delayed from the W-phase by 240°, the V-phase current can be estimated by delaying the phase of the detected W-phase current by 240°. The V-phase current estimation section 140b outputs the V-phase current which is estimated (estimated V-phase current) to the actual torque estimation section 140c.

The actual torque estimation section 140c estimates the actual torque based on the estimated V-phase current supplied from the V-phase current estimation section 140b and also estimates the actual torque based on the estimated W-phase current supplied from the W-phase current estimation section 140a. The actual torque of the motor generator MG2 is generally calculated from the magnetic flux $\phi$, the q-axis current, and the angular velocity $\omega$, as follows:

Actual torque=$\phi \times$q-axis current$\times |\omega|$ The magnetic flux $\phi$ is calculated from the number of windings, field current, or the like, of the coils of the motor generator MG2, and the q-axis current is calculated from three-phase current of the motor generator MG2 by using a known three-phase/two-phase conversion function. Here, the d-axis is a direction of the magnetic flux which is formed by the magnetic pole of the rotor in the vector control of the motor generator MG2, and the q-axis is orthogonal to the d-axis. The angular velocity $\omega$ can be obtained from the rotation angle detected by the resolver 124. The actual 12 torque estimation section 140c estimates the actual torque based on the detected V-phase current, the estimated W-phase current, and the rotation angle detected by the resolver 124. More specifically, the actual torque estimation section 140c uses the detected V-phase current and the estimated W-phase current to calculate the remaining U-phase current and estimate the q-axis current, and estimates the actual torque from this q-axis current. The actual torque which is estimated in this manner is regarded as the actual torque based on the estimated W-phase current. Further, the actual torque estimation section 140c estimates the actual torque based on the detected W-phase current, the estimated V-phase current, and the rotation angle detected by the resolver 124. More specifically, the actual torque estimation section 140c uses the detected W-phase current and the estimated V-phase current to calculate the remaining U-phase current and estimate the q-axis current, and estimates the actual torque from this q-axis current. The actual torque which is estimated in this manner is regarded as the actual torque based on the estimated V-phase current. The actual torque estimation section 140c outputs the actual torque based on the estimated W-phase current and the actual torque based on the estimated V-phase current to the comparison section 140d.

The actual torque estimation section 140c, in addition to the estimation described above, further estimates the actual torque by using the V-phase current detected by the V-phase current sensor and the W-phase current detected by the W-phase current sensor. The actual torque which is detected in this manner is regarded as the actual torque based on the detected current. The actual torque estimation section 140c outputs the actual torque based on the detected current to the comparison section 140d. The actual torque based on the detected current is used for initial determination as to whether or not any abnormalities exist in the control of the motor generator MG2.

The comparison section 140d compares the torque command value output from the hybrid ECU 15 with each of the estimated torques output from the actual torque estimation section 140c. More specifically, the comparison section 140d compares the torque command value Tm2* with the actual torque based on the detected current. The comparison section 140d also compares a difference value between the torque command value Tm2* and the actual torque based on the estimated W-phase current with a difference value between the torque command value Tm2* and the actual torque based on the estimated V-phase current. The comparison section 140d then outputs these comparison results to the determination section 140e.

The determination section 140e, by using the comparison results supplied from the comparison section 140d, distinguishes whether or not any abnormality occurs in the control of the motor generator MG2, and when any abnormality occurs, distinguishes whether or not the abnormality occurs in the current sensor.

2.2 Second Abnormality Detection Processing

Figure 3:
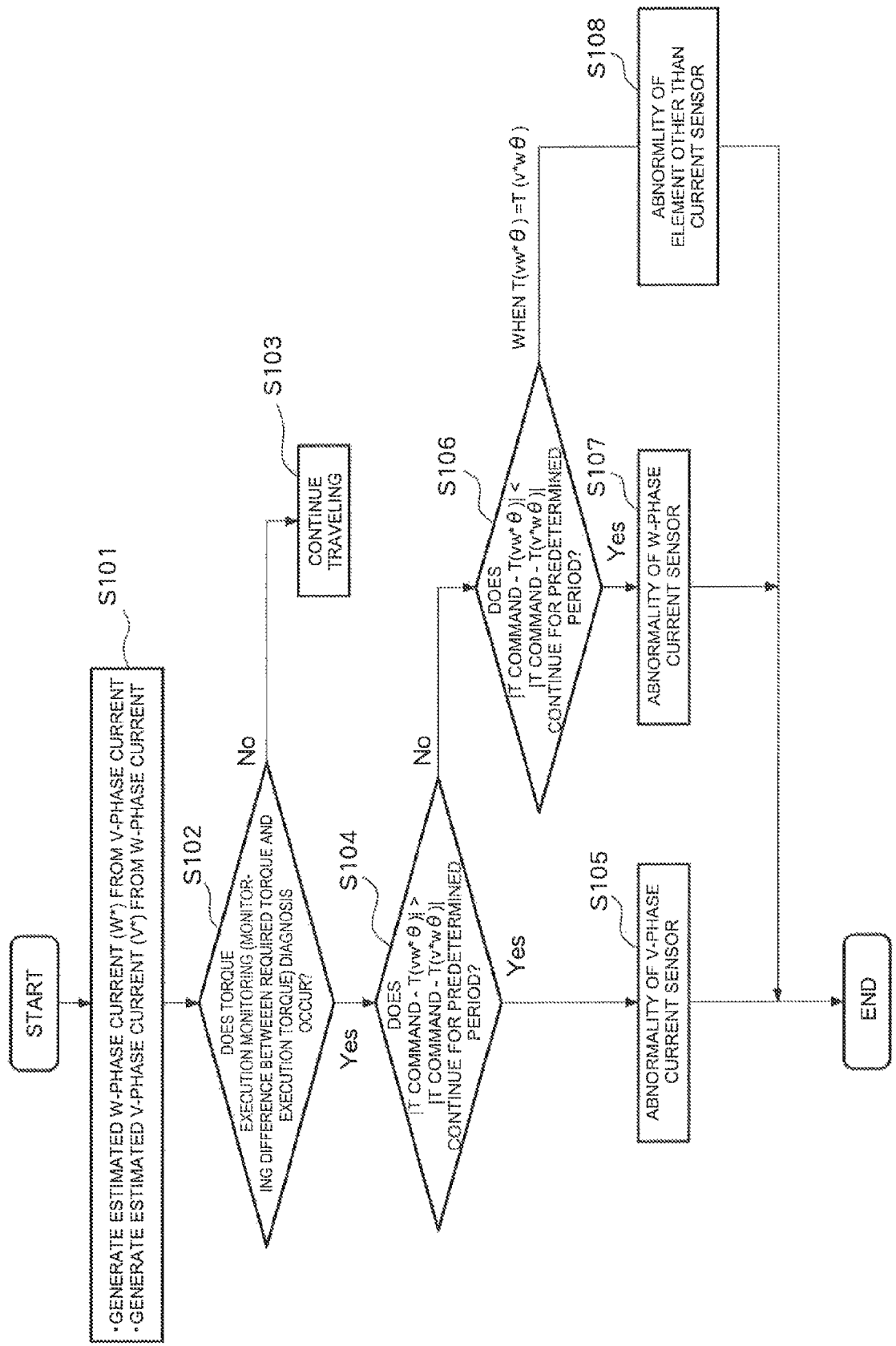
FIG. 3
Flowchart of abnormality detection processing according to an embodiment.

FIG. 3 illustrates a flowchart of the abnormality detection processing that is executed in the MGECU 140. First, the estimated W-phase current is generated based on the detected V-phase current by the W-phase current estimation section 140a of the MGECU 140, and the estimated V-phase current is generated based on the detected W-phase current by the V-phase current estimation section 140b (S101).

Next, the MGECU 140 determines whether or not torque execution monitoring diagnosis has occurred (S102). Here, the torque execution monitoring diagnosis refers to processing of determining whether or not the difference value between the torque command value Tm2* and the actual torque based on the detected current is a predetermined value or greater, and, if the difference value between the torque command value Tm2* and the actual torque based on the detected current is a predetermined value or greater, it is determined that any abnormality occurs and a DIAG signal is generated. The predetermined value can be set arbitrarily and can be set to 40 N·m, for example. Further, in place of determining whether or not the difference value between the torque command value Tm2* and the actual torque based on the detected current is a predetermined value or greater, there may be determined whether or not a time period in which the difference value between the torque command value Tm2* and the actual torque based on the detected current is a predetermined value or greater continues for a predetermined time or longer. The predetermined time can also be set arbitrarily, and can be set to 1 second, for example. This torque execution monitoring processing can be executed by the comparison section 140d.

When the torque execution monitoring diagnosis has not occurred (when the DIAG signal is not generated), it is determined that no abnormalities occur and control of the motor generator MG2 is normally executed, and travelling is continued (S103). When the torque execution monitoring diagnosis has occurred (when the DIAG signal is generated), the comparison section 140d compares the difference value (absolute value) between the torque command value Tm2* and the actual torque based on the estimated W-phase current and the difference value (absolute value) between the torque command value Tm2* and the actual torque based on the estimated V-phase current and determines whether or not the relationship of magnitude between the two difference values continues for a predetermined time. More specifically, a determination is made as to whether or not the difference value (absolute value) between the torque command value Tm2* and the actual torque based on the estimated W-phase current is greater than the difference value (absolute value) between the torque command value Tm2* and the actual torque based on the estimated V-phase current and another determination is made as to whether this relationship between the two values continues for a predetermined time period (S104). In the drawing, for the convenience of explanation, the actual torque based on the estimated W-phase current is represented by $T(vw^*\theta)$ and the actual torque based on the estimated V-phase current is represented by $T(v^*w\theta)$. Here, in $T(vw^*\theta)$, v represents the detected V-phase current, $w^*$ represents the estimated W-phase current, and $\theta$ represents the rotation angle, so that $T(vw^*\theta)$ indicates that the actual torque is determined as a function of these physical quantities.

When the difference value (absolute value) between the torque command value Tm2* and the actual torque based on the estimated W-phase current is greater than the difference value (absolute value) between the torque command value Tm2* and the actual torque based on the estimated V-phase current and this relationship of the two values continues for a predetermined time period, this result is output to the determination section 140e. The determination section 140e, considering that the difference value between the Tm2* and the actual torque has been increased due to the abnormality in the estimated W-phase current; i.e., that the detected V-phase current on which estimation of the W-phase current is based is abnormal, determines an abnormality of the V-phase current sensor (S105).

On the other hand, when NO is determined in step S104, it is then determined whether or not the difference value (absolute value) between the torque command value Tm2* and the actual torque based on the estimated V-phase current is greater than the difference value (absolute value) between the torque command value Tm2* and the actual torque based on the estimated W-phase current and whether this relationship of magnitude between the two values continues for a predetermined time period (S106). When it is determined that the difference value (absolute value) between the torque command value Tm2* and the actual torque based on the estimated V-phase current is greater than the difference value (absolute value) between the torque command value Tm2* and the actual torque based on the estimated W-phase current and this relationship of the two values continues for a predetermined time period, this result is output to the determination section 140e. The determination section 140e, considering that the difference value between the Tm2* and the actual torque has been increased due to the abnormality in the estimated V-phase current; i.e., that the detected W-phase current on which the estimation of the V-phase current is based is abnormal, determines an abnormality of the W-phase current sensor (S107).

Further, when NO is determined in step S104 and NO is also determined in step S106, and more specifically when there is no difference between the torque command value and the actual torque $T(vw^*\theta)$ based on the estimated W-phase current and simultaneously there is no difference between the torque command value and the actual torque T(v*wθ) based on the estimated V-phase current; in other words, when the actual torque T(vw*θ) based on the estimated W-phase current and the actual torque T(v*wθ) based on the estimated V-phase current are equal to each other or are different from each other by only a slight amount, the determination section 140e determines that abnormalities occur in neither the V-phase current sensor nor the W-phase current sensor and that an element other than these current sensors, which is the resolve 124, for example, is abnormal (S108).

As described above, the MGECU 140 can determine whether or not an abnormality occurs in the control of the motor generator MG2, and when an abnormality is found, can further distinguish whether or not such an abnormality is caused by the current sensors 125.

2.3 Third Abnormality Detection Processing

Figure 4:
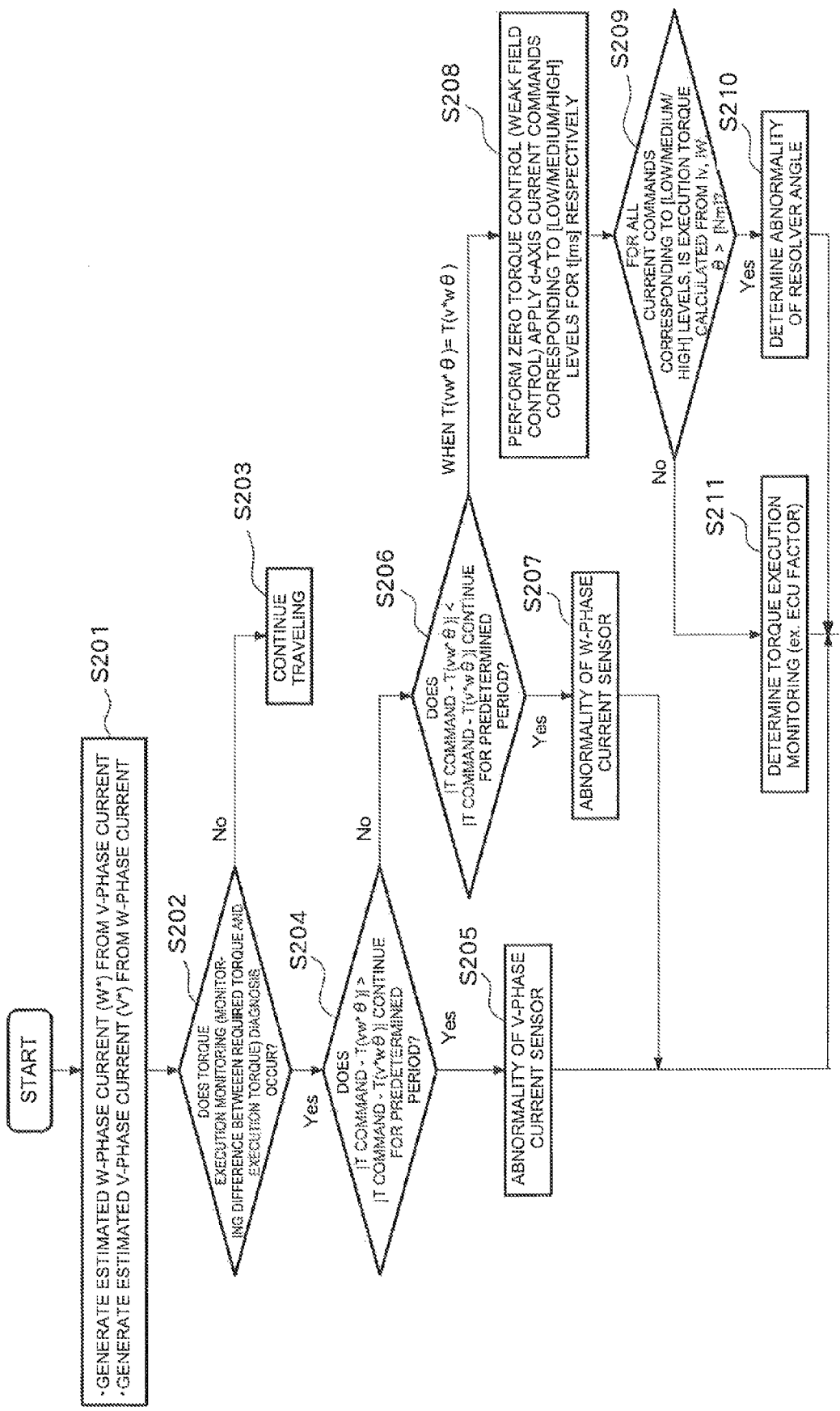
FIG. 4
Flowchart of abnormality detection processing according to another embodiment.

FIG. 4 illustrates a flowchart of another abnormality detection processing which is executed by the MGECU 140. The processing in steps S201 to S207, which is the same as the processing in steps S101 to S107 in FIG. 3, will not be described.

While in the processing illustrated in FIG. 3, when NO is determined in step S106; i.e., when the actual torque T(vw*θ) based on the estimated W-phase current and the actual torque T(v*wθ) based on the estimated V-phase current are equal to each other or different from each other by only a slight amount, it is determined that an element other than the current sensors is abnormal, in the processing illustrated in FIG. 4, the abnormality of the resolver 124 and other abnormalities can be further distinguished.

Specifically, when NO is determined in step S206, the MGECU 140 executes zero torque control (weak field control) (S208). With the zero torque control, the q-axis current command value is set to zero to thereby make the torque of the motor generator MG2 zero. More specifically, as described above, because the torque of the motor generator MG2 can be obtained as follows:

torque=φ×q-axis current×|ω| if the q-axis current is zero, the torque of the motor generator MG2 is also zero. Then, the d-axis current command value is applied to the motor generator MG2 for a predetermined time (50 milliseconds, for example), while varying the d-axis current command among three levels; i.e., low, medium, and high values. Here, the low, medium, and high values can be set arbitrarily, and may be set to 10 A, 40 A, and 70 A, respectively, for example.

Then, the actual torque estimation section 140c estimates the actual torque based on the detected V-phase current, the detected W-phase current, and the rotation angle θ detected by the resolver 124, and the comparison section 140d determines whether or not the estimated actual torque is substantially zero, and more specifically whether or not the estimated actual torque is greater than zero (S209). This determination processing is performed with respect to each of the low, medium, and high d-axis current commands. As the zero torque control has been performed in step S208, the actual torque which is estimated in step S209 should be zero. However, if the actual rotation angle of the rotor is shifted due to the abnormality of the resolver 124, the actual torque is not zero. Accordingly, the determination section 140e determines an abnormality of the resolver 124 when the actual torque is not zero for any of the low, medium, and high d-axis current command values (S210). Here, it is possible to determine the abnormality of the resolver 124 in step S210, because it is determined, in steps S204 and S206, that no abnormalities occur in the current sensor 125.

When NO is determined in the processing of step S209; i.e., when the actual torque is zero, as this indicates that no abnormalities occur in the resolver 124 either, it is determined that the abnormality is a system fault other than abnormalities of the current sensors 125 and the revolver 124, such as the torque execution monitoring failure of the hybrid ECU 15 and the MGECU 140 (S211).

2.4 Modification Examples

While the embodiments of the present invention have been described, the present invention is not limited to these examples and various modifications can be made.

For example, while in FIG. 4, the processing in step S208 is executed with the three levels of d-axis current command values; low, medium, and high values, whether or not the actual torque is zero may be determined by executing the processing only with any one of the command values.

Further, in FIG. 4, it is also possible that the motor generator MG2 is driven a plurality of times while fixing the d-axis current command value to any one of the values in the processing of step S208 and the abnormality of the resolver 124 is determined when the actual torque is not zero for any of the multiple times.

Also, in FIG. 4, when the processing in step S208 is executed with the three levels of d-axis current command values; that is, low, medium, and high values, the abnormality of the resolver 124 may be determined when the actual torque is not zero for two or more values of the low, medium, and high values, rather than when the actual torque is not zero for any of these three values. In other words, the abnormality of the resolver 124 may be determined based on majority rule.

Also, in FIG. 4, when the processing in step S208 is executed with the three levels of d-axis current command values; that is, low, medium, and high values, the abnormality of the resolver 124 may be determined when the actual torque sequentially increases in accordance with the magnitude of the d-axis current command value.

Further, while whether or not the actual torque is greater than zero is determined in the processing of step S209 in FIG. 4, whether or not the actual torque is substantially zero may be determined by comparing the actual torque with a predetermined threshold value which is near zero and determining whether or not the actual torque is equal to or greater than the predetermined threshold value.

Further, while whether or not the actual torque is greater than zero is determined in the processing of step S209 in FIG. 4, it is also possible that, when the actual torque is greater than zero, the resolver rotation speed is further compared with a collinear diagram to confirm the presence of a deviation and the abnormality of the resolver 124 is determined. As, when the actual torque is greater than zero, a fluctuation is caused in the rotation speed of the motor generator MG2 due to the generation of the actual torque, it is possible to confirm the abnormality of the resolver 124 by detecting the fluctuation in the rotation speed of the motor generator MG2.

Also, while in the above examples, the V-phase current and the W-phase current are detected by the current sensors 125, the U-phase current and the V-phase current may be detected or the U-phase current and the W-phase current may be detected. As such, the present invention is applicable to a structure in which the current sensors 125 detect currents of any two phases among U-phase, V-phase, and W-phase. Here, it is not necessary to detect currents of all three phases by the current sensors 125 because, as the sum of the currents of the three phases is zero, if the currents of two phases can be detected, the current of the remaining phase can be calculated. However, as a matter of course, the present invention is also applicable to a structure in which the current sensor 125 detects the currents of three phases.

Further, while the motor generators MG1 and MG2 are three-phase motors in the above examples, the present invention is not necessarily limited to this structure and can be similarly applied to a multiple-phase motor including three or more phases. In this case, it is possible to determine abnormalities of the current sensors 125 that detect currents of at least first and second phases of the multiple-phase motor. More specifically, the second-phase current is estimated based on the first-phase current detected by the first-phase current sensor 125 to estimate the actual torque, and the first-phase current is estimated based on the second-phase current detected by the second-phase current sensor 125 to estimate the actual torque.

Further, while in the above examples, the abnormality of the current sensor 125 is determined by using a difference between the torque command value and the estimated actual torque, the abnormality of the current sensor 125 can be determined more simply by comparing the estimated W-phase current with the detected W-phase current or comparing the estimated V-phase current with the detected V-phase current, after estimating the W-phase current from the detected V-phase current and estimating the V-phase current from the detected W-phase current in step 101 of FIG. 3 and in step S201 in FIG. 4. The former can be regarded as torque-based current sensor abnormality determination, while the latter can be regarded as current-based current sensor abnormality determination.

Figure 5:
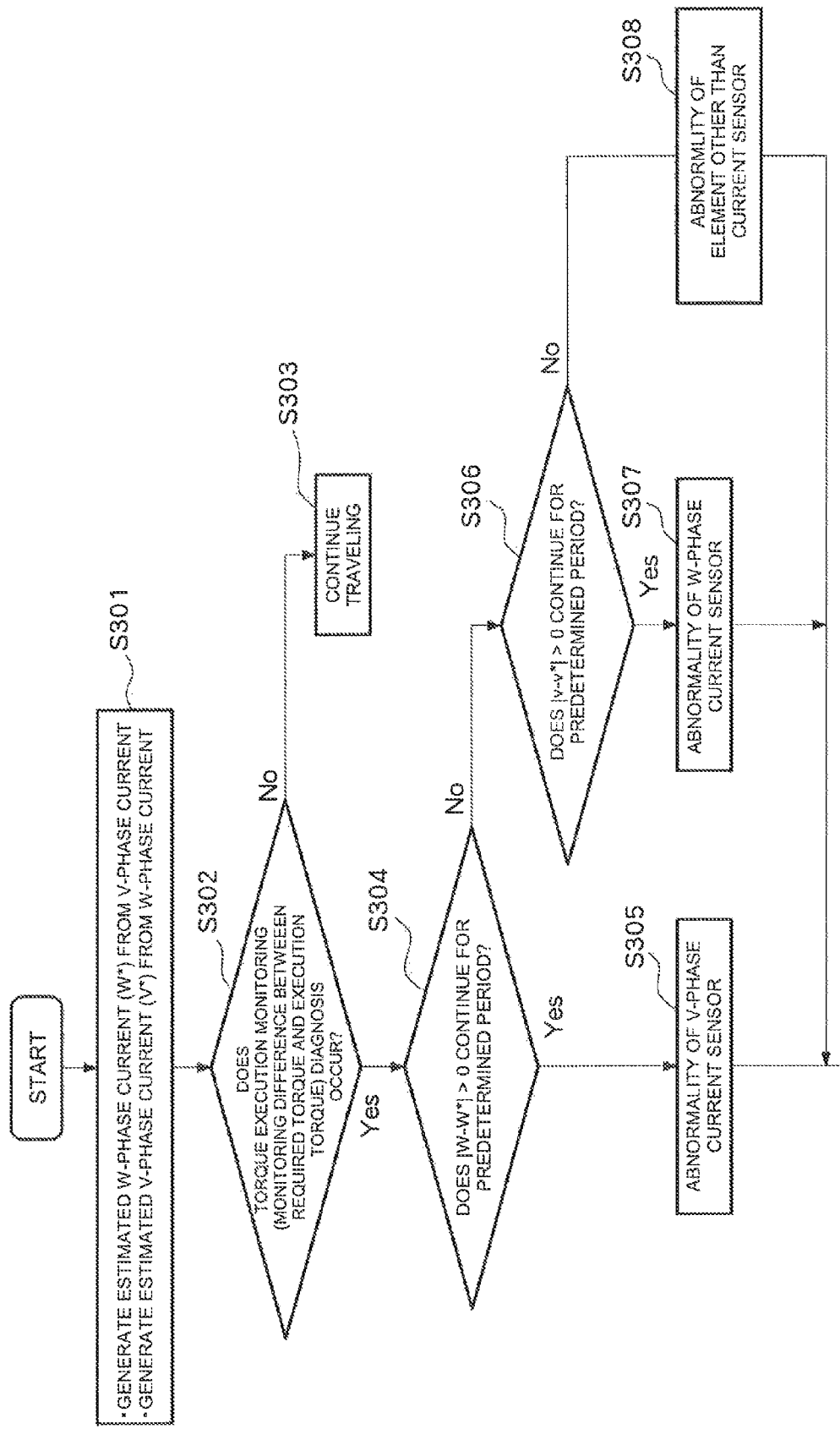
FIG. 5
Flowchart of abnormality detection processing according to still another embodiment.

FIG. 5 illustrates a flowchart of abnormality determination processing in this case. The processing in steps S301 to S303, which is the same as the processing in steps S101 to S103 and the processing in steps S201 to S203 in FIG. 4, will not be described.

When the torque execution command diagnosis occurs in the processing of step S302, it is then determined in the comparison section 140d, whether or not a state, in which a difference value (absolute value) between the detected W-phase current (which is abbreviated as W in the figure) and the estimated W-phase current (which is abbreviated as W* in the figure) is not substantially zero; i.e., the difference value is greater than zero, continues for a predetermined period (S304). If an abnormality occurs in the V-phase current sensor 125, as an abnormality also occurs in the estimated W-phase current generated based on the detected V-phase current, there is generated a difference between the detected W-phase current and the estimated W-phase current. Accordingly, when a state in which the difference value (absolute value) between the detected W-phase current and the estimated W-phase current is not substantially zero; i.e., the difference value is greater than zero, continues for a predetermined period, the determination section 140e determines the abnormality of the V-phase current sensor (S305).

When NO is determined in the processing in step S304, it is then determined in the comparison section 140d whether or not a state in which a difference value (absolute value) between the detected V-phase current (which is abbreviated as V in the figure) and the estimated V-phase current (which is abbreviated as V* in the figure) is not substantially zero; i.e., the difference value is greater than zero, continues for a predetermined period (S306). If an abnormality occurs in the W-phase current sensor, as an abnormality also occurs in the estimated V-phase current generated based on the detected W-phase current, there is generated a difference between the detected V-phase current and the estimated V-phase current. Accordingly, when a state in which the difference value (absolute value) between the detected. V-phase current and the estimated V-phase current is not substantially zero; i.e., the difference value is greater than zero, continues for a predetermined period, the determination section 140e determines the abnormality of the W-phase current sensor (S307). Further, when NO is determined in the processing in step S306, it is determined that the abnormality occurs in an element other than the current sensors (S308).

In the processing illustrated in FIG. 5, the processing in step S302 may be omitted. Further, either the processing in step S304 or the processing in step S306 may be executed. In this case, the V-phase current and the W-phase current are detected by the current sensors, and at least one of the v-phase current and the W-phase current is used to estimate the other current, and based on the difference between the detected current and the estimated current, an abnormality of the current sensor can be determined.

With the processing described above, it is possible to distinguish between an abnormality of the current sensor and an abnormality of other elements (e.g. an abnormality of the resolver 124) without forming the current sensor in a duplex system. As a result, a location of failure can be specified without increasing costs, and therefore troubleshooting can be facilitated.

REFERENCE SYMBOLS LIST 10 battery, 15 hybrid ECU, 110 converter, 112, 114 inverter, 124 resolver, 125 current sensor, 140 MGECU.

The invention claimed is:

1. A motor control apparatus comprising:
an inverter that supplies electric power to a multi-phase motor;
a first current sensor that is provided on an output side of the inverter for detecting current of a first phase of the multi-phase motor;
a second current sensor that is provided on an output side of the inverter for detecting current of a second phase of the multi-phase motor;
an estimation unit that estimates, from at least one of the current of the first phase and the current of the second phase, current of the other phase; and
a determination unit that determines an abnormality of the first and second current sensors based on a difference between the current that is detected and the current that is estimated,
wherein the estimation unit includes:
a unit that estimates current of the second phase based on the current of the first phase that is detected by the first current sensor;
a unit that estimates current of the first phase based on the current of the second phase that is detected by the second current sensor;
a unit that estimates a first actual torque of the multi-phase motor based on the current of the first phase that is detected by the first current sensor and the current of the second phase that is estimated; and
a unit that estimates a second actual torque of the multi-phase motor based on the current of the second phase that is detected by the second current sensor and the current of the first phase that is estimated, and
wherein the determination unit determines an abnormality of the first and second current sensors based on a difference between a torque command value for driving the multi-phase motor with a desired torque and the first actual torque and a difference between the torque command value and the second actual torque.

2. The motor control apparatus according to claim 1, wherein
the determination unit determines that the abnormality occurs in the first and second current sensors when there exists a difference between the torque command value for driving the multi-phase motor with a desired torque and the first actual torque or a difference between the torque command value and the second actual torque, and determines that the abnormality does not occur in the first and second current sensors when there exists neither a difference between the torque command value and the first actual torque nor a difference between the torque command value and the second actual torque.

3. The motor control apparatus according to claim 2, wherein
the determination unit determines that the abnormality occurs in the first current sensor when the difference between the torque command value and the first actual torque is greater than the difference between the torque command value and the second actual torque, and determines that the abnormality occurs in the second current sensor when the difference between the torque command value and the second actual torque is greater than the difference between the torque command value and the first actual torque.

4. The motor control apparatus according to claim 1, further comprising:
a rotation angle sensor that detects a rotation angle of the motor,
wherein the estimation unit includes:
a unit that estimates current of the second phase based on the current of the first phase that is detected by the first current sensor;
a unit that estimates current of the first phase based on the current of the second phase that is detected by the second current sensor;
a unit that estimates a first actual torque of the multi-phase motor based on the current of the first phase that is detected by the first current sensor, the current of the second phase that is estimated, and the rotation angle;
a unit that estimates a second actual torque of the multi-phase motor based on the current of the second phase that is detected by the second current sensor, the current of the first phase that is estimated, and the rotation angle; and
a unit that estimates a third actual torque of the multi-phase motor based on the current of the first phase that is detected by the first current sensor, the current of the second phase that is detected by the second current sensor, and the rotation angle, and
wherein the determination determines whether an abnormality occurs in the first and second current sensors or in the rotation angle sensor based on a difference between a torque command value for driving the multi-phase motor with a desired torque and the first actual torque, a difference between the torque command value and the second actual torque, and a difference between the torque command value and the third actual torque.

5. The motor control apparatus according to claim 4, wherein
the determination unit determines that the abnormality occurs in the first and second current sensors when there exists a difference between the torque command value for driving the multi-phase motor with a desired torque and the first actual torque or a difference between the torque command value and the second actual torque, and determines that the abnormality occurs in the rotation angle sensor when there exists neither a difference between the torque command value and the first actual torque nor a difference between the torque command value and the second actual torque and there exists a difference between the torque command value and the third actual torque.

6. The motor control apparatus according to claim 5, further comprising:
a unit that drives the multi-phase motor with zero torque,
wherein when there exists neither a difference between the torque command value and the first actual torque nor a difference between the torque command value and the second actual torque and there exists a difference between the torque command value and the third actual torque, the determination unit determines that an abnormality occurs in the rotation sensor if the third actual torque is not zero after the multi-phase motor is driven by the drive unit and determines that an abnormality occurs in an element other than the first and second current sensors and the rotation sensor if the third actual torque is zero after the multi-phase motor is driven by the drive unit.

7. The motor control apparatus according to claim 4, wherein
the multi-phase motor is a three-phase motor formed of U-phase, V-phase, and W-phase,
the first phase is the V-phase, and the second phase is the W-phase,
the estimation unit includes:
a unit that estimates current of the W-phase based on the current of the V-phase that is detected by the first current sensor;
a unit that estimates current of the V-phase based on the current of the W-phase that is detected by the second current sensor;
a unit that estimates a first actual torque of the multi-phase motor based on the current of the V-phase that is detected by the first current sensor, the current of the W-phase that is estimated, and the rotation angle;
a unit that estimates a second actual torque of the multi-phase motor based on the current of the W-phase that is detected by the second current sensor, the current of the V-phase that is estimated, and the rotation angle; and
a unit that estimates a third actual torque of the multi-phase motor based on the current of the V-phase that is detected by the fit current sensor, the current of the W-phase that is detected by the second current sensor, and the rotation angle, and
wherein the determination unit determines whether an abnormality occurs in the first and second current sensors or in the rotation angle sensor based on a difference between a torque command value for driving the multi-phase motor with a desired torque and the first actual torque, a difference between the torque command value and the second actual torque, and a difference between the torque command value and the third actual torque.

8. The motor control apparatus according to claim 1, wherein
the multi-phase motor is a three-phase motor formed of U-phase, V-phase, and W-phase, and
the first phase and the second phase are any two phases of the U-phase, the V-phase, and the W-phase.

9. The motor control apparatus according to claim 1, wherein
the multi-phase motor is a three-phase motor formed of U-phase, V-phase, and W-phase,
the first phase is the V-phase, and the second phase is the W-phase,
the estimation unit includes:
a unit that estimates current of the W-phase based on the current of the V-phase that is detected by the first current sensor;
a unit that estimates current of the V-phase based on the current of the W-phase that is detected by the second current sensor;
a unit that estimates a first actual torque of the multi-phase motor based on the current of the V-phase that is detected by the first current sensor and the current of the W-phase that is estimated; and
a unit that estimates a second actual torque of the multi-phase motor based on the current of the W-phase that is detected by the second current sensor and the current of the V-phase that is estimated, and
wherein the determination unit determines an abnormality of the first and second current sensors based on a difference between a torque command value for driving the multi-phase motor with a desired torque and the first actual torque and a difference between the torque command value and the second actual torque.

* * * * *